United States Patent
Soldo et al.

(10) Patent No.: US 8,763,637 B2
(45) Date of Patent: Jul. 1, 2014

(54) ROTARY VALVE POSITION INDICATOR DEVICE AND METHOD FOR INDICATING THE POSITION OF A ROTARY VALVE

(75) Inventors: Giovanni Soldo, Brescia (IT); Mark E. Peters, Cincinnati, OH (US)

(73) Assignee: Soldo S.r.l. Socio Unico, Desenzano del Garda, Brescia (IT)

( * ) Notice: Subject to any disclaimer, the term of this patent is extended or adjusted under 35 U.S.C. 154(b) by 353 days.

(21) Appl. No.: 12/954,075

(22) Filed: Nov. 24, 2010

(65) Prior Publication Data
US 2011/0290332 A1 Dec. 1, 2011

(30) Foreign Application Priority Data

Dec. 29, 2009 (IT) .............................. BS2009A0241

(51) Int. Cl.
*F16K 37/00* (2006.01)

(52) U.S. Cl.
USPC ......... 137/554; 137/553; 324/207.2; 116/277

(58) Field of Classification Search
CPC .......................... F16K 37/0041; F16K 37/0033
USPC ............... 137/533, 552, 554, 553; 324/207.2; 116/277

See application file for complete search history.

(56) References Cited

U.S. PATENT DOCUMENTS

| | | | | |
|---|---|---|---|---|
| 4,518,008 A * | 5/1985 | Fenster et al. | | 137/552 |
| 5,223,822 A * | 6/1993 | Stommes et al. | | 137/551 |
| 6,124,710 A * | 9/2000 | Kordecki | | 324/207.2 |
| 6,135,147 A | 10/2000 | Peters et al. | | |
| 6,707,293 B2 * | 3/2004 | Wan et al. | | 324/207.25 |
| 6,820,647 B1 * | 11/2004 | Grecco et al. | | 137/552 |
| 7,036,791 B2 * | 5/2006 | Wiese | | 251/129.04 |
| 7,235,963 B2 * | 6/2007 | Wayama | | 324/117 H |
| 2007/0034264 A1 | 2/2007 | Kunz et al. | | |
| 2009/0267594 A1 * | 10/2009 | Kather | | 324/207.25 |

* cited by examiner

*Primary Examiner* — John Rivell
*Assistant Examiner* — Angelisa Hicks
(74) *Attorney, Agent, or Firm* — Shoemaker and Mattare (57) ABSTRACT

A rotary valve position indicator utilizes a magnet keyed to a shaft, and a magnetic field sensor mounted beside the magnet, to indicate the angular position of the shaft. A magnetic pole sensor detects the initial polarity of the magnet during setup to determine how to correlate the output readings of the magnetic field sensor with the position of the valve. The sensors are located so they permit the shaft to extend through to a mechanical visual indicator.

8 Claims, 14 Drawing Sheets

ROTARY VALVE POSITION INDICATOR DEVICE AND METHOD FOR INDICATING THE POSITION OF A ROTARY VALVE

FIELD OF THE INVENTION

The present invention relates to an indicator device for indicating the position of a rotary valve and to a method for indicating the position of a rotary valve.

BACKGROUND OF THE INVENTION

It is desirable to have an indication of the position of a rotary valve relative to its fully open and fully closed positions, both in order to know what function the valve is performing at any given time and to be able to control the valve. An electronic means for indicating the position is particularly desirable for valves that are controlled from a remote location or that are located in a place that is difficult to access. At the same time, it is desirable to have a mechanical indicator that can be read directly at the valve. Typically, a valve actuator is mounted on the same shaft as the valve and the valve position indicator (the shaft may be made in connected segments), and the actuator causes the shaft to rotate in order to open and close the valve. A controller at a remote location may control the actuator in order to open and close the valve while using the electronic position indicator to know the position of the valve as it is being rotated by the actuator.

Initial electronic valve position indicators relied on limit switches, mounted onto the actuator which operated the valve, to indicate the open and closed positions of the valve. Later valve position indicators included an indicator shaft operationally connected to the valve shaft or to the actuator shaft (which in turn is connected to the valve shaft), and mechanical devices rotating with the shaft to visually indicate the valve position. These later mechanical valve position indicators allow the indicator shaft to go straight through the valve position indicator, permitting the installation of a physical indicator on top of the valve position indicator (typically a window or a bubble on top of the indicator device secured to the top of the shaft, and a transparent cap or cover to protect this physical indicator and seal the housing) which rotates with the indicator shaft to give a clear visual indication of the valve position.

One prior art indicator, shown in U.S. patent application Ser. No. 11/202,227, "Kunz", uses a magnetic flux sensor to detect a magnetic field induced by two opposed magnets mounted to rotate with the shaft of the valve position indicator. The polar axes of those magnets are perpendicular to and extend through the axis of rotation of the shaft. This sensor measures the magnetic field in a plane which is substantially coplanar with the magnets and on the axis of rotation of the shaft, so it locates the sensor directly above the shaft, which prevents the shaft from passing through to be able to use a mechanical valve-position indicator on top of the indicator device. This also prevents the device from using the enclosures which had been designed and certified for the previous generation of mechanical indicators.

SUMMARY OF THE INVENTION

A goal of the present invention is to provide a rotary valve position indicator that provides both an electronic sensor and a traditional mechanical display that mounts at the top of the device, on a shaft extending through the device.

One embodiment of the present invention provides an indicator which includes a magnet which is keyed to an indicator shaft, a magnetic field sensor which senses the magnetic field, and a magnetic pole sensor which is used to determine the orientation of the poles of the magnet when the valve is in a fully open or fully closed position, in order to determine which algorithm is to be used to correlate the output of the magnetic field sensor with the position of the valve. The magnetic pole sensor and magnetic field sensor are placed off to the side of the indicator shaft, so they permit the indicator shaft to extend through to a traditional mechanical indicator on top of the device, which also enables the device to use a traditional housing that has already been approved.

This arrangement results in a solid state indicator which can correctly, consistently, and repeatedly indicate the position of a valve relative to its fully open or fully closed positions, using only a single magnetic field sensor, even when the indicator is removed from the valve and then reinstalled, or even when the indicator is taken apart and reassembled, even if the magnet is in a different orientation relative to the valve when the device is reassembled and reinstalled.

BRIEF DESCRIPTION OF THE DRAWINGS

The present invention will be described hereinafter with reference to the attached figures, wherein.

DETAILED DESCRIPTION OF THE INVENTION

Figure 1:
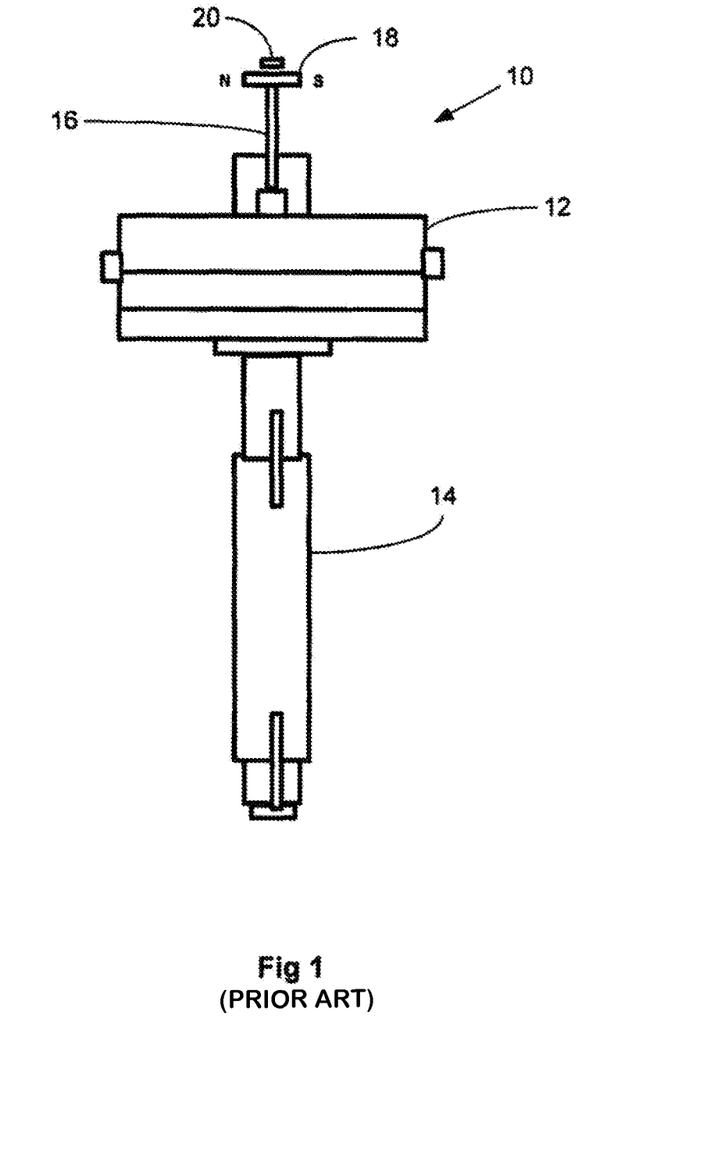
FIG. 1 is a schematic side view of a prior art indicator mounted onto an actuator which in turn is mounted onto a valve.

With reference to the above mentioned figures, FIG. 1 is a schematic side view of a prior art rotary valve position indicator 10 (with the housing and other components omitted for clarity) mounted onto an actuator 12 which is mounted onto a valve 14. The actuator 12 may include an electric motor or a pneumatic or hydraulic or other device (not shown), which drives the shaft of the actuator 12. (US Patent Publication 2007/0034264 "Kunz et al", which is hereby incorporated herein by reference, is similar to the design shown in FIG. 1, except that it has two magnets, one on each side of the shaft, instead of a single magnet at the top of the shaft. In Kunz, the magnets are keyed to the shaft by being fixed to a rotating unit which is keyed to the shaft.)

Referring now to FIGS. 1-3C, the prior art indicator 10 includes a shaft 16, which is operationally connected to the shaft of the valve 14 via the actuator 12. It also includes a magnet 18 and a magnetic field sensor 20. The magnetic field of the magnet 18 is represented by the field lines 22 which may be represented as emanating from the north pole of the magnet 18 and ending at the south pole, though in reality these field lines always make complete loops; they neither start nor end. The magnetic field sensor 20 is located directly above the shaft 16, which is aligned with the axis of rotation of the shaft of the valve 14 and of the indicator shaft 16.

Figure 2:
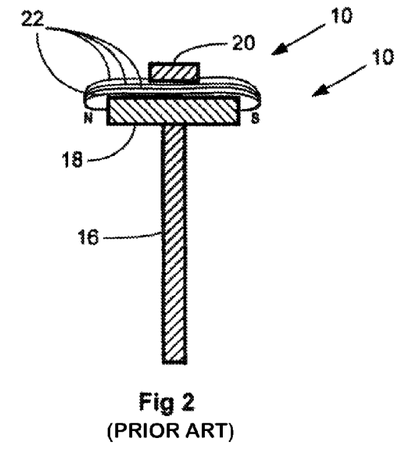
FIG. 2 is an enlarged section view of the shaft, magnet, and sensor of the prior art indicator of FIG. 1, showing the magnetic field lines.

The magnetic field sensor 20 may be either a Hall Effect sensor, which is a transducer that varies its output voltage in response to changes in the magnetic field, or a Magneto-Resistive (MR) sensor, which makes use of the magnetoresistive effect, the property of current carrying magnetic material to change its resistivity in the presence of an external magnetic field. In either case, the magnetic field sensor 20 provides an output that can be correlated to the angular position of the shaft 16.

Figure 3A:
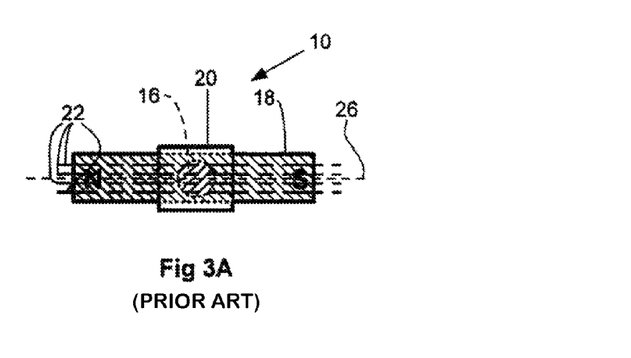
FIG. 3A is a top view of the shaft, magnet, and sensor of FIG. 2.

FIG. 3A is a top view of the prior art indicator 10 of FIG. 2. The magnet 18 is keyed to the shaft 16 and mounted above the shaft 16. The polar axis 26 of the magnet (which is a line extending from the center of the north pole of the magnet to the center of the south pole of the magnet) extends perpendicular to and through the axis of rotation of the shaft 16.

The indicator device is constructed so that the axis of the magnetic field sensor 20 is parallel to the polar axis 26 of the magnet 18 when the valve is in the fully closed position. This means that the magnetic field sensor 20 is also parallel to the magnetic field 22 of the magnet 18 when the valve is in that fully closed position. In this case, the magnetic field sensor 20 is an MR sensor 20, which, in this position, being parallel to the magnetic field, outputs its lowest resistivity. In this particular case, this position of the shaft 16 and the magnet 18 correspond to the fully closed position of the valve 14.

Figure 3B:
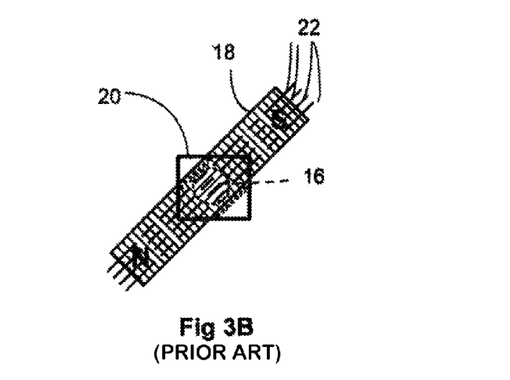
FIG. 3B is the same view as FIG. 3A, except the shaft and magnet have rotated 45 degrees.
Figure 3C:
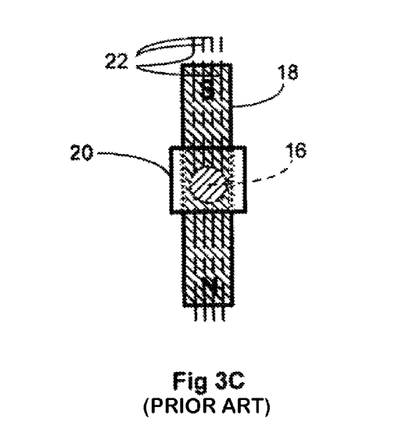
FIG. 3C is the same view as FIG. 3B, except the shaft and magnet have rotated an additional 45 degrees.
Figure 4:
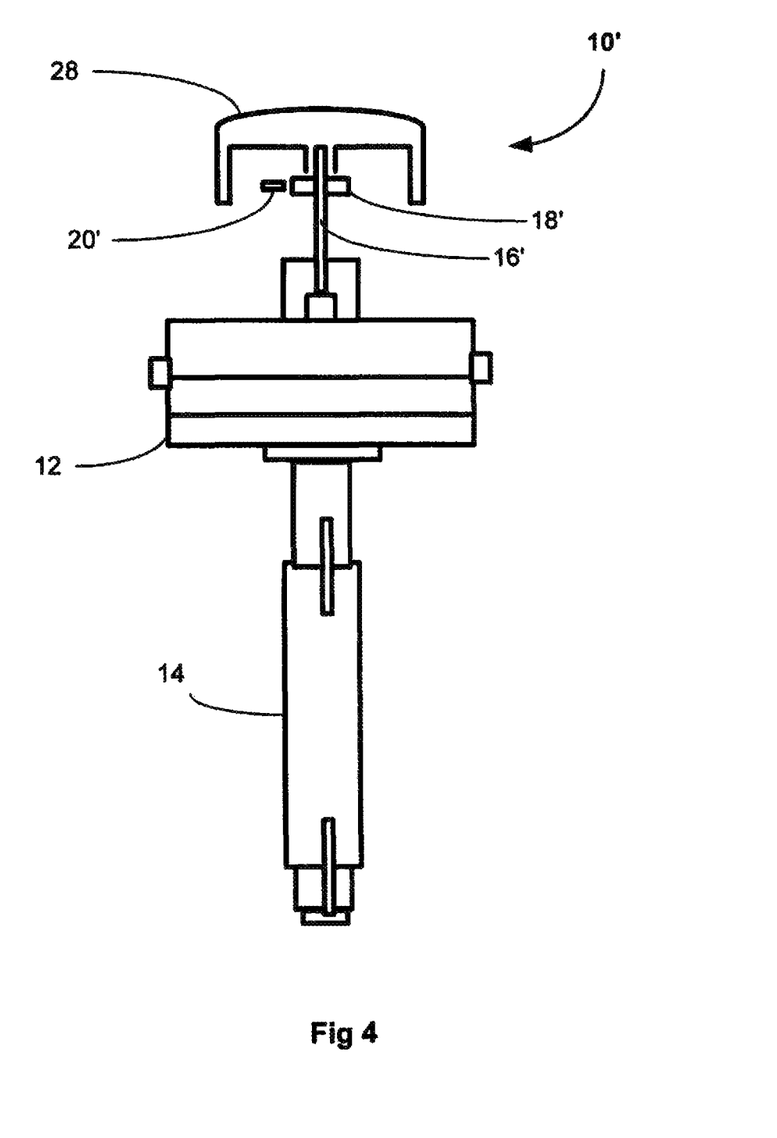
FIG. 4 is a schematic side view of an indicator mounted onto an actuator which in turn is mounted onto a valve.

When the shaft 16 and magnet 18 are rotated counterclockwise through a 45 degree angle, to the position shown in FIG. 3B (corresponding to a half open position of the valve 14), the magnetic field sensor 20 (which remains fixed and does not rotate with the shaft 16 and magnet 18) outputs a higher resistivity. Finally, the shaft 16 and magnet 18 are rotated counterclockwise through an additional 45 degree angle, to the position shown in FIG. 3C (corresponding to the fully open position of the valve 14). In this position, the MR sensor 20 (which still remains fixed) outputs its highest resistivity. The correlation between the resistivity of the Magneto-Resistive (MR) sensor 20 and the angular position of the shaft 16 is nearly linear through this 90 degree rotation, which represents the rotation of the valve 14 from a fully closed position (lowest resistivity) to a fully open position (highest resistivity).

As may be appreciated from FIG. 2, the location of the magnetic field sensor 20, directly above the shaft 16, prevents the shaft 16 from being able to extend through the device in order to provide a traditional top-mounted mechanical indicator of the valve position (such as the indicator drum 100 shown in FIG. 9 of U.S. Pat. No. 6,135,147 "Peters et al", which is hereby incorporated herein by reference). Similarly, the mechanical indicator 5 in FIG. 1b of the Kunz reference is not located on top, where it would be most visible, but rather is located on the side so it can still be mechanically connected directly to the shaft. Thus, it can be seen that this type of device has lost the advantage of being able to have a top mounted mechanical indicator.

FIGS. 4 and 5A-5D are schematic views of an embodiment of an indicator 10' made in accordance with the present invention. It includes a shaft 16' having the same axis of rotation as, and operationally connected to, the shaft of the valve 14 via the actuator 12. The shafts of the indicator 10', the actuator 12, and the valve 14 have mating parts that key them to each other. As shown in FIG. 6, the end of the shaft of the actuator 12 has a flat projection 12A extending across its diameter, and the shaft of the valve 14 has a corresponding flat recess 14A across its diameter that receives the flat projection 12A. There is a similar connection between the shaft 16' of the indicator 10' and the shaft of the actuator 12.

The indicator 10' also includes a magnet 18', a magnetic field sensor 20', which, in this embodiment, is a magneto-resistive sensor, and a pole sensor 24', which, in this embodiment is a unipolar Hall-effect switch. It also includes a visual mechanical indicator 36, which is shown in FIGS. 6-10, mounted on top of, and operationally connected to, the shaft 16'.

The magnet 18' is keyed to the shaft 16', so it rotates with the shaft 16' as the valve 14 is opened and closed. The magnetic field sensor 20' and the pole sensor 24' are stationary—fixed relative to the housing of the indicator 10'. The mechanical indicator 36 rotates with the shaft 16'.

As described in more detail later, the magnet 18' is a diametrically magnetized ring with north and south poles (See FIG. 5B) marked N and S respectively. The magnetic field sensor 20' is a magneto-resistive (MR) sensor 20' which, as indicated earlier, makes use of the magneto-resistive effect, the property of current carrying magnetic material to change its resistivity in the presence of an external magnetic field.

An MR sensor displays a varying resistivity output which can be correlated to the angular orientation of an external magnetic field. It should be pointed out that the magnetic field sensor 20' could instead be another type of magnetic field sensor, such as an analog Hall-effect sensor which also has an output (in this instance a varying voltage drop) which can be correlated to the angular orientation of an external magnetic field. In this particular embodiment, the magnetic field sensor 20' is an MR sensor due to the fact that the voltage drop across an MR sensor is less than the voltage drop across an analog Hall-effect sensor and, since the indicator is powered parasitically from the actuator 12, the lower energy requirements of the MR sensor are preferred.

The magnetic pole sensor 24' is a unipolar Hall-effect switch which, as explained in more detail later, is used to detect the polarity of the magnet 18' when the valve is in the fully closed position. The detection of this polarity is then used to determine which algorithm to apply to the data produced by the magnetic field sensor 20' to determine the angular position of the valve 14 relative to the fully open or the fully closed positions. In this particular embodiment, the valve 14 is in its fully closed position when the polar axis 26' of the magnet 18' is aligned with the magnetic pole sensor 24'. Since the magnet 18' is keyed to the shaft 16' of the indicator 10', and the shaft 16' is keyed to the shaft of the valve 14 via the shaft of the actuator 12, the indicator can be assembled and installed only in such a way that the polar axis 26' is aligned with the magnetic pole sensor 24' when the valve 14 is in the fully closed position. However, it can be oriented in either of two ways: either with the north pole oriented toward the pole sensor 24', as shown in FIG. 5B, or with the south pole oriented toward the pole sensor 24'.

In a set-up procedure, the magnetic pole sensor 24' is used to detect which pole of the magnet 18' is directed toward the pole sensor 24' when the valve 14 is in the fully closed position, and thereafter this polarity information is used to determine which algorithm to apply to the data produced by the magnetic field sensor 20' to determine the angular position of the valve 14 relative to its fully open or fully closed position. In this particular case, the algorithms are embodied by two tables of data that are used by the controller: one that converts the output of the magnetic field sensor 20' to the angular position of the valve 14 if the north pole of the magnet 18' is oriented toward the pole sensor 24' during the setup, when the valve 14 is in the fully closed position, and the other that converts the output of the magnetic field sensor 20' to the angular position of the valve if the south pole of the magnet 18' is oriented toward the pole sensor 24' during the setup, when the valve 14 is in the fully closed position. If desired, the algorithms could instead be embodied by two different equations that would be applied by the controller depending upon the initial orientation of the magnet 18' when the valve 14 is in the fully closed position.

With the particular magnetic pole sensor 24' being used in this embodiment, the sensor is activated when the south pole of the magnet is directed toward it and is deactivated otherwise. Thus, in the position shown in FIG. 5B, the polar sensor 24' would be deactivated, indicating to the controller that the south pole is not directed toward the polar sensor. If the magnet were oriented in the opposite direction during setup, with the south pole oriented toward the polar sensor 24', then the polar sensor 24' would be activated and would indicate to the controller that the south pole was oriented toward it. (It should be noted that the indicator 10' could be arranged so that the polar axis 26' is oriented with the pole sensor 24' when the valve is in the fully open position instead of the fully closed position, and in that case the set-up would be done with the valve in the fully open position and the algorithm would relate the output of the magnetic field sensor 20' on that basis.)

Figure 5A:
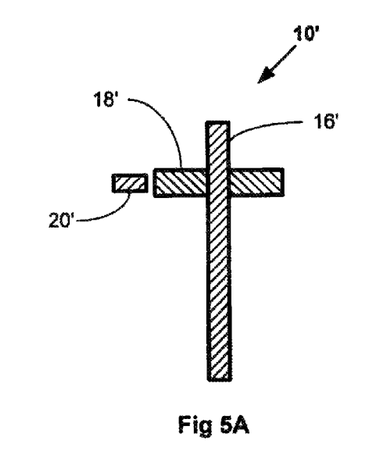
FIG. 5A is an enlarged schematic section view showing the shaft, magnet, and one of the sensors of the indicator of FIG. 4.
Figure 5B:
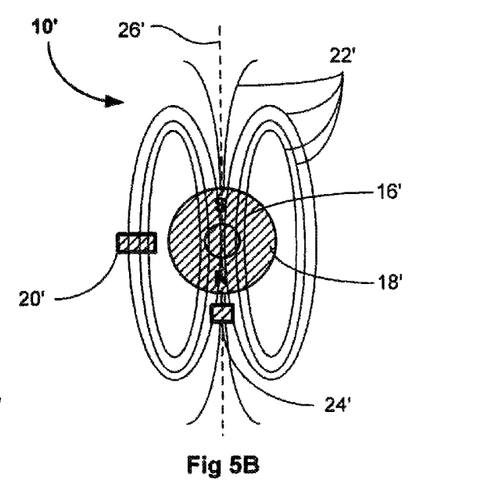
FIG. 5B is a top view of the shaft, magnet, and sensors of the indicator of FIG. 4, showing the magnetic field lines.
Figure 5C:
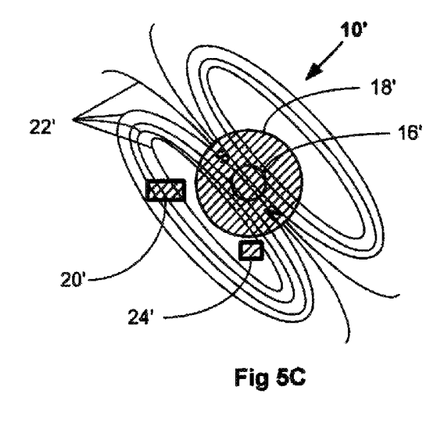
FIG. 5C is the same view as FIG. 5B, except the shaft and magnet have rotated 45 degrees.
Figure 5D:
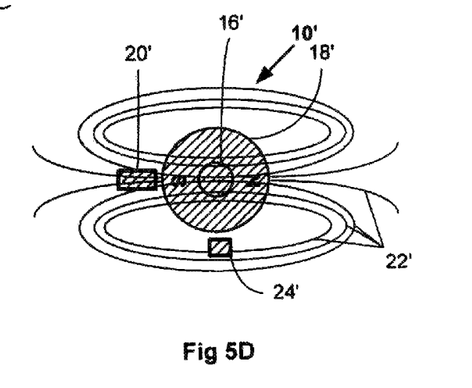
FIG. 5D is the same view as FIG. 5C, except the shaft and magnet have rotated an additional 45 degrees.
Figure 6:
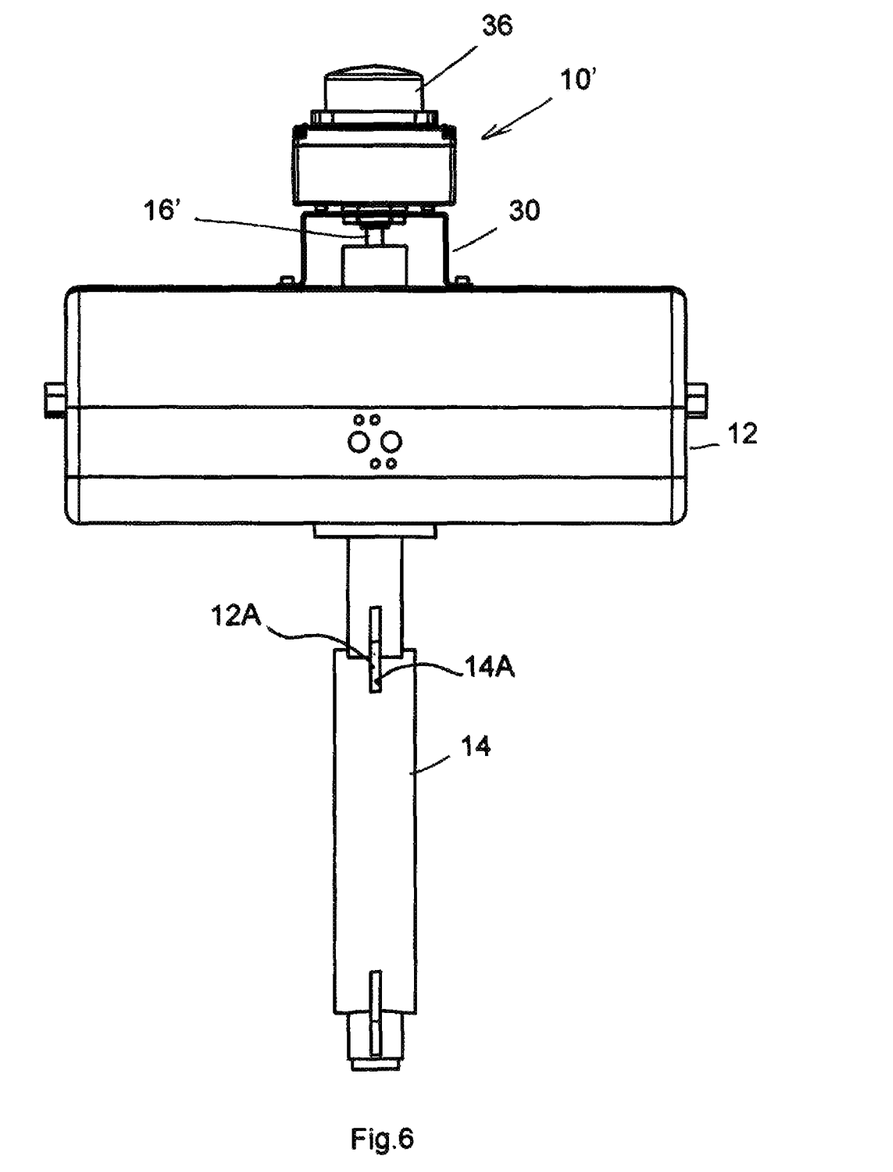
FIG. 6 is very similar to FIG. 4, except it shows the outer housing of the valve position indicator.

Referring to FIGS. 5B, 5C, and 5D, it may be appreciated that the magnetic field sensor 20' is able to sense the magnetic field lines 22' as the shaft 16' (and the magnet 18' which is secured to the shaft 16') rotates through 90 degrees of rotation, which, in this embodiment, corresponds to a complete cycle of the valve 14 from a fully closed position shown in FIG. 5B to a fully open position shown in FIG. 5D. The magnetic field sensor 20' produces an output which is then correlated by the controller on the indicator 10' to the angular position of the valve 14 using the algorithm that was selected based on the polarity output of the magnetic pole sensor 24' during setup.

Figure 9:
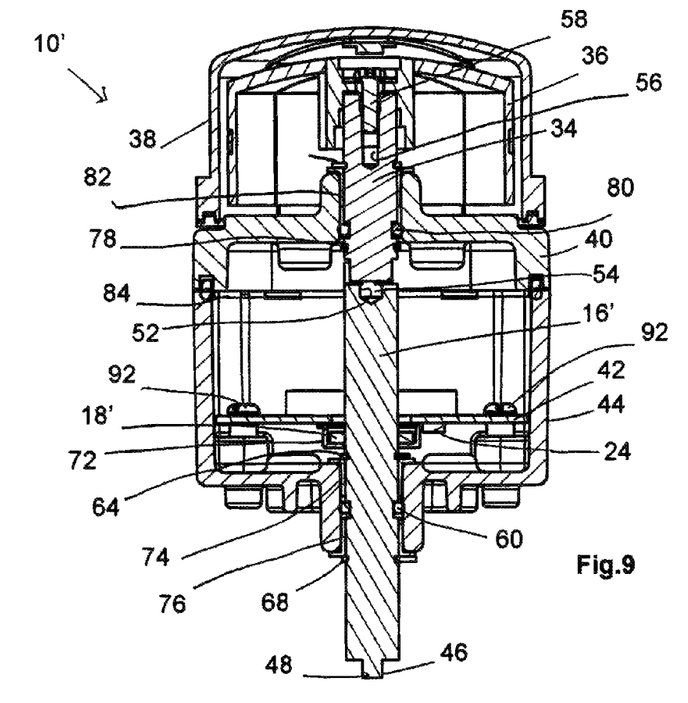
FIG. 9 is a view along line 9-9 of FIG. 8.
Figure 12:
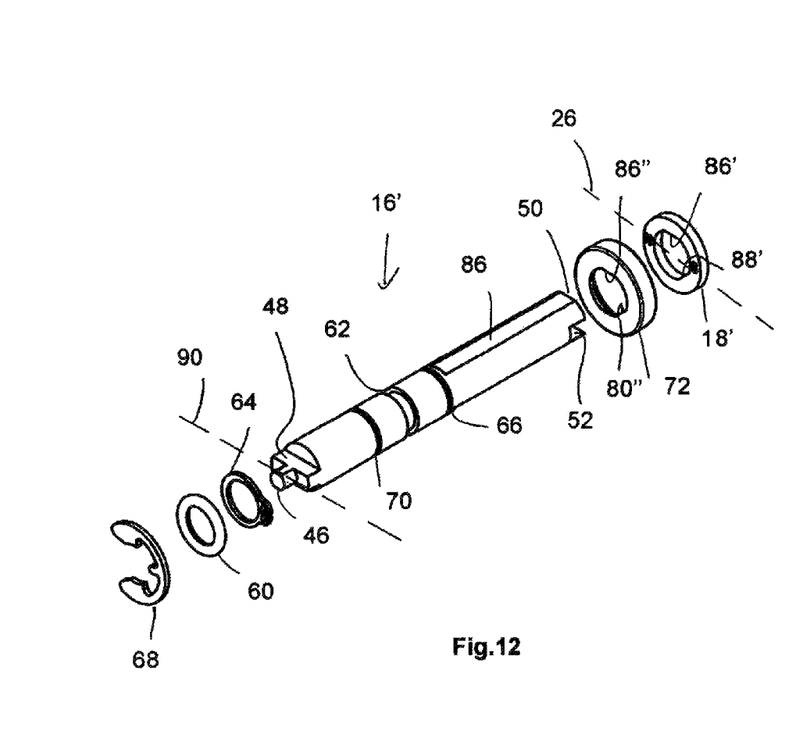
FIG. 12 is an exploded perspective view of the shaft subassembly of the indicator of FIG. 10.

FIG. 6 is a side view of an indicator 10' mounted on an actuator 12 and valve 14. The valve 14 has a shaft which is keyed to the shaft of the actuator 12. The actuator shaft extends through the actuator 12 and projects into the mounting bracket 30, which may be a NAMUR standard mounting bracket 30. The indicator 10' is designed to mount onto the mounting bracket 30, and its main indicator shaft 16' is keyed to the shaft of the valve 14 through the shaft of the actuator 12, all of which rotate together about the same longitudinal axis of rotation. Referring briefly to FIGS. 9 and 12, and as explained in more detail later, the lower end of the indicator shaft 34 of the visual mechanical indicator 36 of the indicator 10' has a flat projection that mates with a slot 52 in the top end of the main indicator shaft 16', and the visual indicator 36 locks onto the upper end of the indicator shaft 34. Similarly, the bottom end of the indicator shaft 16' has a flat projection that is received in a flat recess in the actuator 12 (not shown), and the shaft of the actuator 12 is similarly connected to the shaft of the valve 14, such that the shaft of the valve 14, the shaft of the actuator 12, the main indicator shaft 16', the mechanical indicator shaft 34, and the visual mechanical indicator 36 all rotate in unison about the same longitudinal axis.

Figure 7:
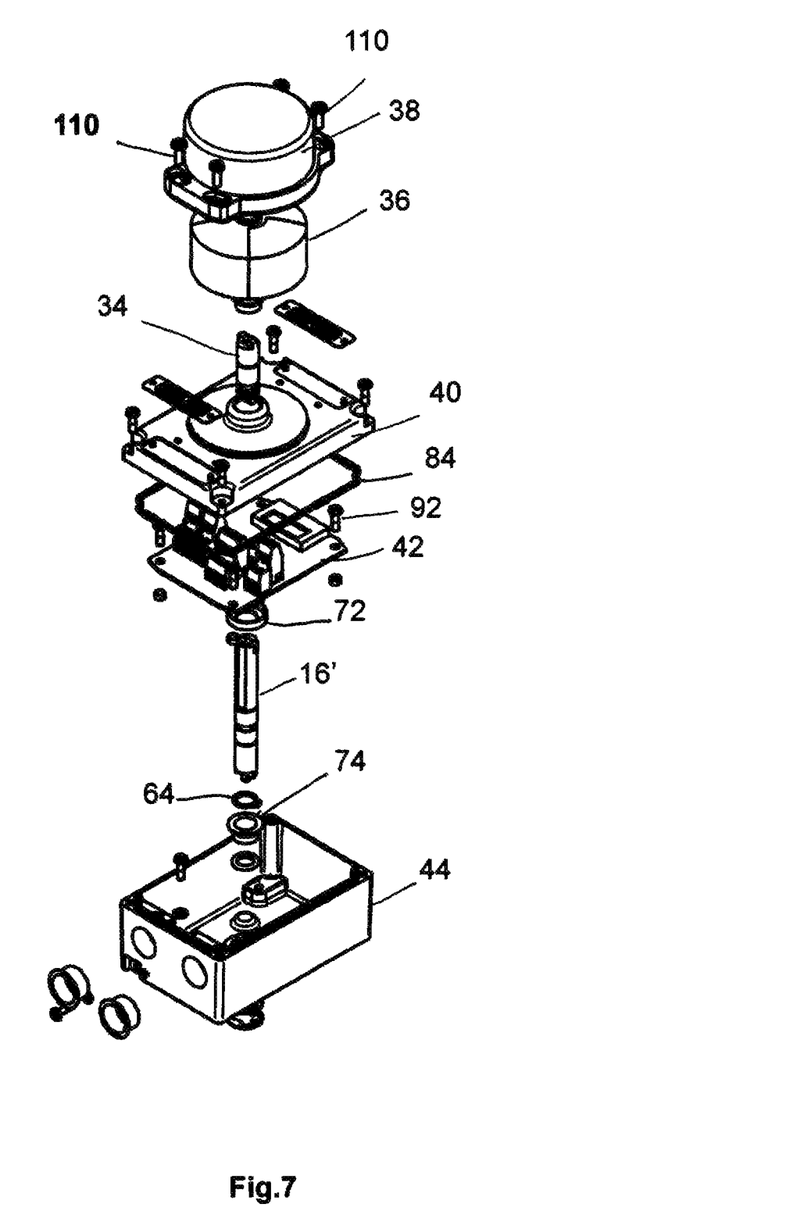
FIG. 7 is an exploded perspective view of the indicator of FIG. 6.
Figure 8:
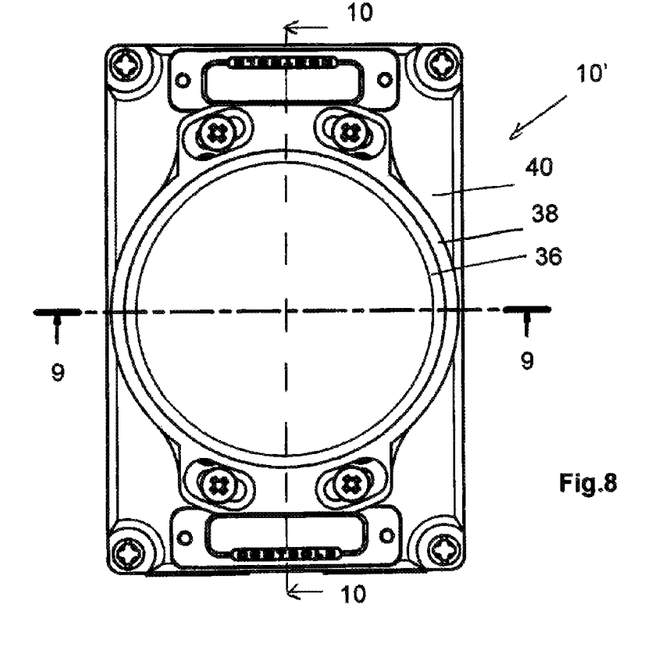
FIG. 8 is a top view of the indicator of FIG. 6.
Figure 11:
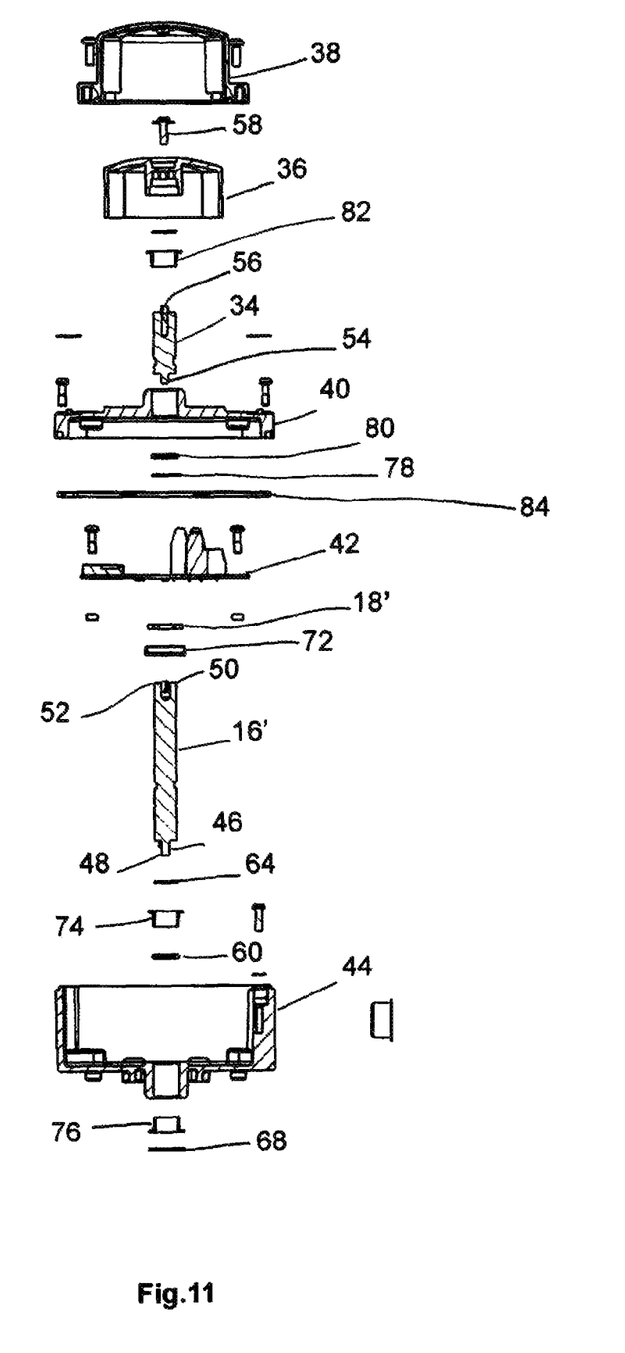
FIG. 11 is an exploded section view of the indicator of FIG. 10.

Referring now to FIGS. 7, 9, and 11, the primary components of the indicator 10' include a protective cap 38, a visual, mechanical indicator 36, a visual mechanical indicator shaft 34, a main indicator shaft 16', a housing cover 40, a circuit board 42 (including a controller), and a housing 44. As indicated above, the main indicator shaft 16' has a lower end 46 defining a projection 48 which engages a corresponding groove in the actuator shaft (not shown) for positive engagement between these two shafts. The main indicator shaft 16' has a top end 50 defining a similar groove 52 which engages a corresponding flat projection 54 on the mechanical visual indicator shaft 34 for positive engagement between these two shafts 16', 34. Finally, the mechanical visual indicator shaft 34 defines, at its top end, a threaded opening 56 (See FIG. 9) which receives a screw 58 which secures the visual indicator 36 to the visual indicator shaft 34. Thus the valve shaft, the main indicator shaft 16', the indicator shaft 34, and the visual indicator 36 are all mechanically connected to each other for positive and direct rotational engagement with each other. Rotation of the valve disc (which is typically an integral part with the valve shaft) results in the same rotation of the visual indicator 36, which is located at the topmost portion of the indicator 10', with only the transparent protective cap 38 seated atop the visual indicator 36.

Referring to FIGS. 18A-19C, it should be noted that the mechanical indicator 36 is divided into quadrants 94, 96, 98, 100 each of which occupies 90 degrees, and it is keyed to the indicator shaft 34 for rotation with the indicator shaft 34. Two of the quadrants 94, 96 which are 180 degrees apart, display a fully closed valve position (heavy crosshatching), and the other two quadrants 98, 100 (also 180 degrees apart from each other) display a fully open valve position (no crosshatching).

Figure 10:
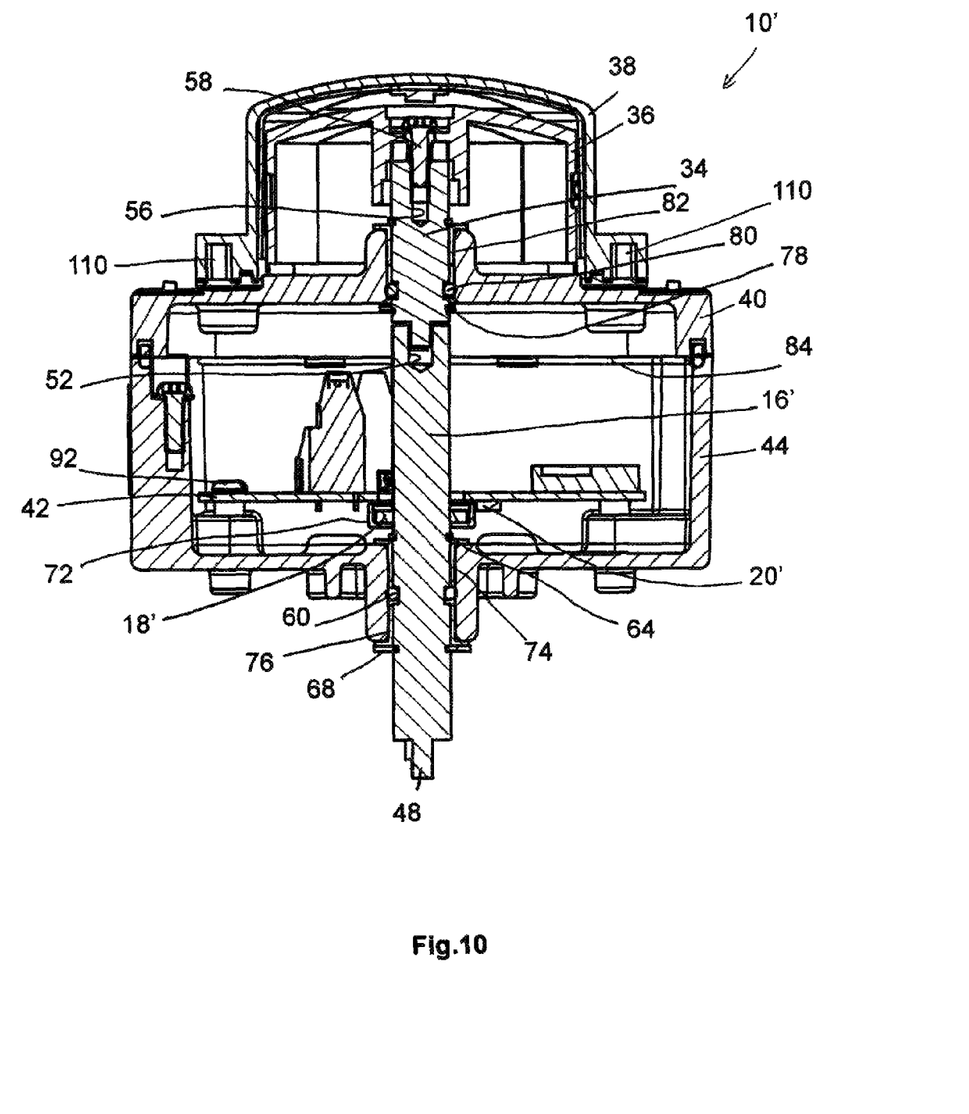
FIG. 10 is a view along line 10-10 of FIG. 8.

The protective cap 38 which rests atop the visual indicator 36 is also divided into quadrants 102, 104, 106, 108, each of which occupies 90 degrees, and it is secured to the housing cover 40 via screws 110 (See FIG. 10). Two of the quadrants 102, 104, which are 180 degrees apart, are transparent to allow viewing of the visual indicator 36 mounted below it (shown with light crosshatching), and the other two quadrants 106, 108 (also 180 degrees apart from each other) are opaque (shown with no crosshatching) so they cover up the portions of the visual indicator 36 mounted below them.

Figures 19A, 19B, 19C:
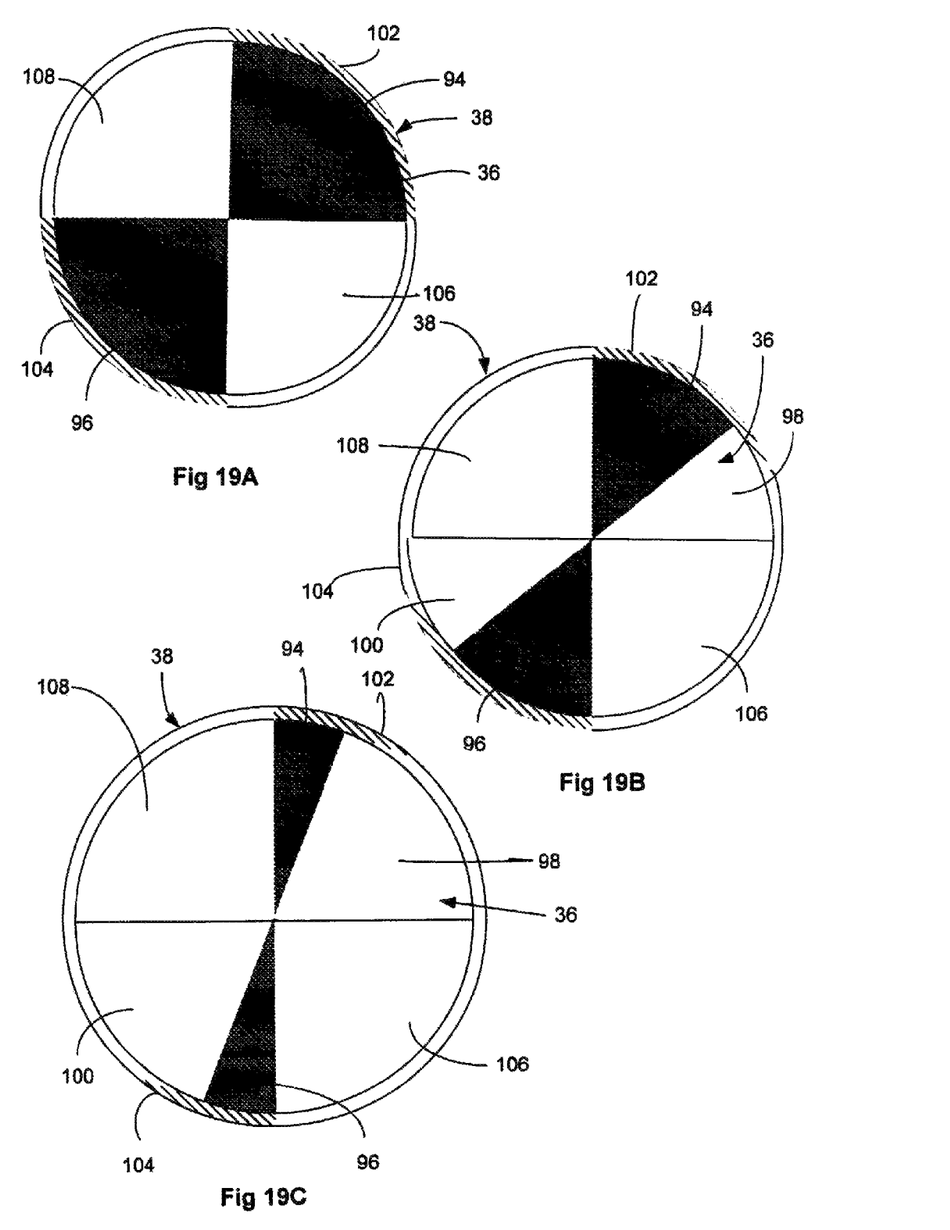
FIG. 19A is a top view of the visual indicator of FIG. 18B under the protective cap of FIG. 18A when the valve position indicator is in the fully closed position.
FIG. 19B is similar to FIG. 19A but when the valve position indicator has rotated approximately 45 degrees toward the valve open position.
FIG. 19C is similar to FIG. 19B but when the valve position indicator has rotated to the almost fully open position of the valve.

FIG. 19A shows the visual indicator 36 wherein its heavily cross-hatched quadrants 94, 96 indicating a fully closed valve position are fully visible through the transparent quadrants or windows 102, 104 of the protective cap 38, while the non-cross-hatched quadrants 98, 100 of the visual indicator 36 are completely hidden behind the opaque quadrants 106, 108 of the protective cap 38.

As the valve rotates, the visual indicator 36 rotates as shown in FIG. 19B wherein its heavily cross-hatched quadrants 94, 96 are only partially visible through the transparent quadrants or windows 102, 104 of the protective cap 38, indicating the valve is partially (approximately 50%) closed. The non-cross-hatched quadrants 98, 100 of the visual indicator 36 are now partially exposed, again helping to visually indicate that the valve is approximately 50% open.

In FIG. 19C the valve has rotated almost completely to the closed position. The visual indicator 36 has rotated further until its heavily cross-hatched quadrants 94, 96 are only barely visible through the transparent quadrants or windows 102, 104 of the protective cap 38, indicating the valve is almost completely open. The non-cross-hatched quadrants 98, 100 of the visual indicator 36 are now almost fully exposed, again helping to visually indicate that the valve is almost completely open.

The mechanical indicator 36 is keyed onto the indicator shaft 34 such that, when the radially-extending axis 90 of the projection 48 of the main indicator shaft 16' and the polar axis 26 of the magnet 18' (See FIG. 12) are aligned with the polar sensor 24', the "fully closed" quadrants 94, 96 of the visual indicator 36 lie directly beneath the transparent "window" quadrants 102, 104 respectively of the protective cap 38, indicating that the valve is fully closed. Should the indicator 10' be removed from the valve 14 and then reassembled with the main shaft 16' rotated 180 degrees, when the valve is in the fully closed position the "fully closed" quadrants 94, 96 of the visual indicator 36 will now lie directly beneath the "window" quadrants 104, 102 respectively of the protective cap 38, indicating that the valve is fully closed. That is, if the visual indicator 36 is rotated 180 degrees, it does not affect its operation/indication.

Figure 13:
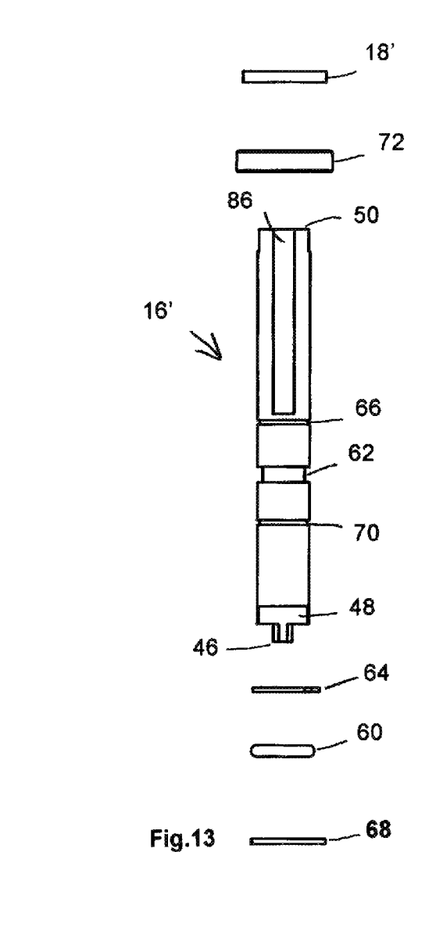
FIG. 13 is an exploded side view of the shaft subassembly of FIG. 12.
Figure 14:
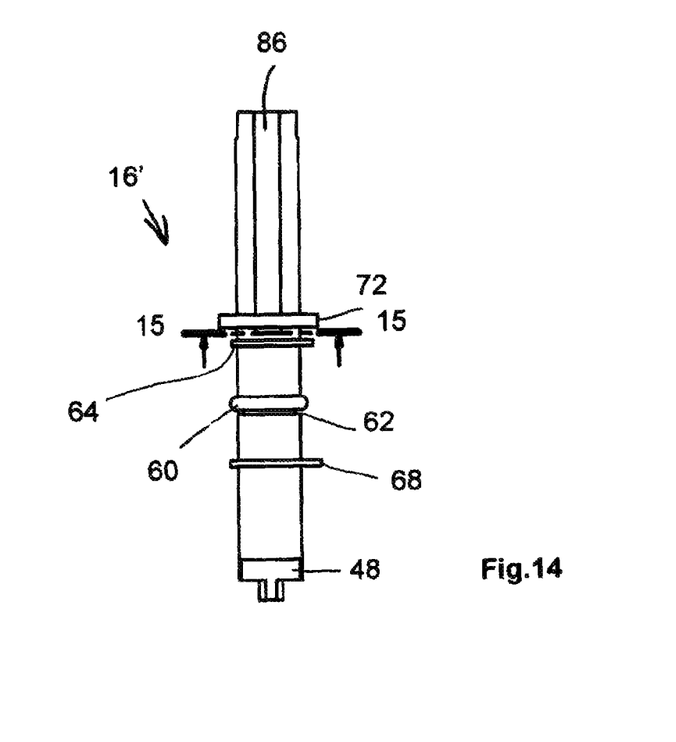
FIG. 14 is an assembled side view of the shaft subassembly of FIG. 12.

Referring now to FIGS. 12, 13, and 14, the main indicator shaft 16' includes an O-Ring 60 seated in an O-Ring groove 62, an external retaining ring 64 seated in its corresponding groove 66, an E-style ring 68 seated in its corresponding groove 70, a magnet 18' as described earlier, and a magnet housing 72. As better appreciated in FIGS. 9 and 10, there are two bushings 74, 76 to rotationally support the main indicator shaft 16' in the housing 44, with the external retaining ring 64 holding in the upper bushing 74, and the E-style ring 68 holding in the lower bushing 76. The bushings 74, 76 help trap the O-Ring 60 between them. A similar arrangement of retainer 78, O-Ring 80, and bushing 82 both seals and supports for rotation the mechanical visual indicator shaft 34 against the housing cover 40. Finally, a gasket 84 seals between the housing cover 40 and the housing 44.

Figure 15:
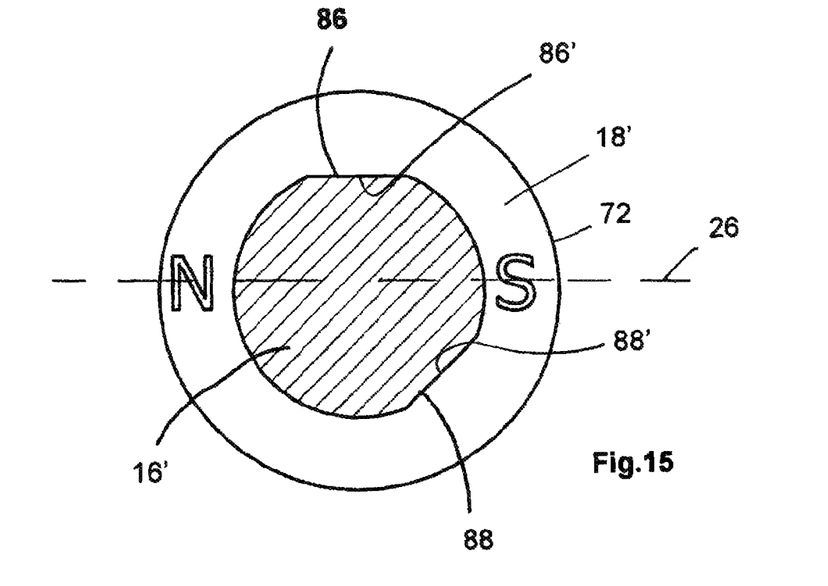
FIG. 15 is a view along line 15-15 of FIG. 14.

Referring back to FIGS. 12, 14 and 15, the upper portion of the main indicator shaft 16' defines two flats 86, 88 extending to its upper end 50. The opening in the magnet 18' has a complementary shape to receive the shaft 16' with a close fit, including two corresponding flats 86', 88'. The first flats 86, 86' are located substantially at the 12:00 position (as seen from the vantage point of FIG. 15), which is located halfway between the north and south poles N, S of the magnet 18'. The second flats 88, 88' are located substantially between the 4:00 and 5:00 positions. As best appreciated in FIG. 12, the magnet housing 72 also has corresponding flats 86", 88", respectively. The flats are located such that the magnet 18' and the magnet housing 72 are keyed together and the magnet 18' can mount onto the main indicator shaft 16' in only one orientation.

This mounting orientation of the magnet 18' onto the main shaft 16' is such that the polar axis 26 of the magnet 18' is perpendicular to the axis of rotation of the main shaft 16' and extends through the axis of rotation. The polar axis 26 also is parallel to the radially-extending axis 90 of the projection 48 of the main indicator shaft 16'. Due to this keying arrangement, the polar axis 26 of the magnet 18' will always be aligned in the same way with the radial axis 90 of the projection 48 of the main indicator shaft 16', but that projection 48 can be inserted into the slot of the shaft of the actuator in either of two orientations, which are 180 degrees apart from each other. Similarly, the shaft of the actuator can be inserted into the slot of the valve shaft in either of two orientations which are 180 degrees apart from each other. This particular indicator 10' is designed with the magnetic pole sensor 24' aligned with the polar axis 26 of the magnet 18' when the valve is in the fully closed position. (It could alternatively be arranged so that the magnetic pole sensor 24' would be aligned with the polar axis 26 of the magnet when the valve is in the fully open position or when the valve is in some other desired position that would be convenient for setup.)

Thus, no matter how the indicator 10' is assembled and mounted to the valve 14, once the magnetic pole sensor 24' of the indicator 10' determines the polarity of the magnet 18' during setup and selects the algorithm to be used to correlate the data from the magnetic field sensor 20' with the valve position, then the indicator 10' will be able to indicate the angular position of the valve as it opens and closes.

It should be noted that the magnet 18' could be keyed to the main indicator shaft 16' using a more conventional keying mechanism which would allow the magnet 18' to be flipped "up-side down" and still mount onto the main indicator shaft 16', if desired. In this instance, the position of the north and south poles N, S of the magnet 18' would be reversed relative to the frame of reference of the housing of the indicator 10'. However, the magnetic pole sensor 24' would once again detect the polarity of the magnet 18' during setup in order to automatically determine which algorithm to use to properly correlate the output of the magnetic field sensor 20' to the angular position of the valve 14.

Figure 16:
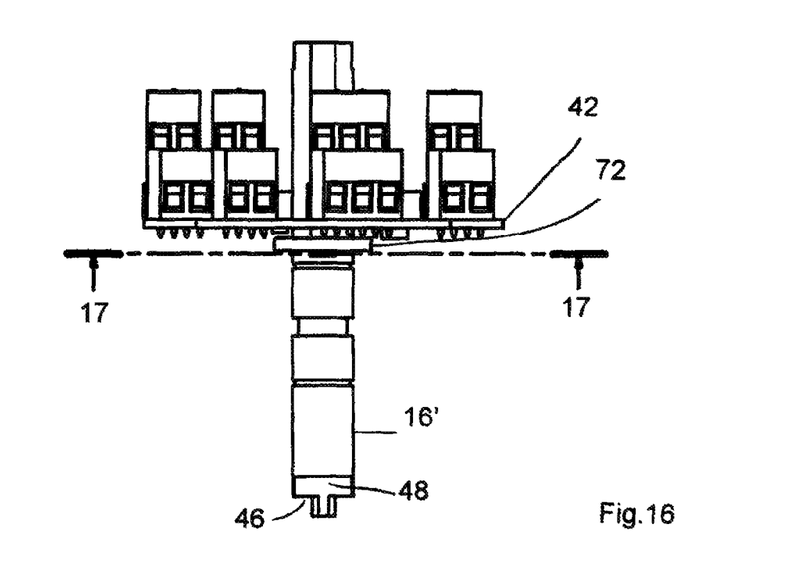
FIG. 16 is a side view of the shaft subassembly and of the circuit board of FIG. 7.

FIG. 16 is a side view of the main indicator shaft 16' and the circuit board 42 of the indicator 10' of FIG. 7. The sensors 20', 24' and the control circuitry are mounted on the circuit board 42. It can be appreciated from the view in FIGS. 7, 9, and 10 that the circuit board 42 is mounted to the housing 44 with the fixing screws 92 such that the circuit board 42 is fixed relative to the housing 44 of the indicator 10'. As best appreciated in FIGS. 17, 9, and 10, both of the sensors 20', 24' are mounted to the circuit board 42 and are therefore also fixed to the housing 44 of the indicator 10'. The main indicator shaft 16', on the other hand, is supported by the bushings 74, 76 for rotation relative to the housing 44 and to the circuit board 42.

Figure 17:
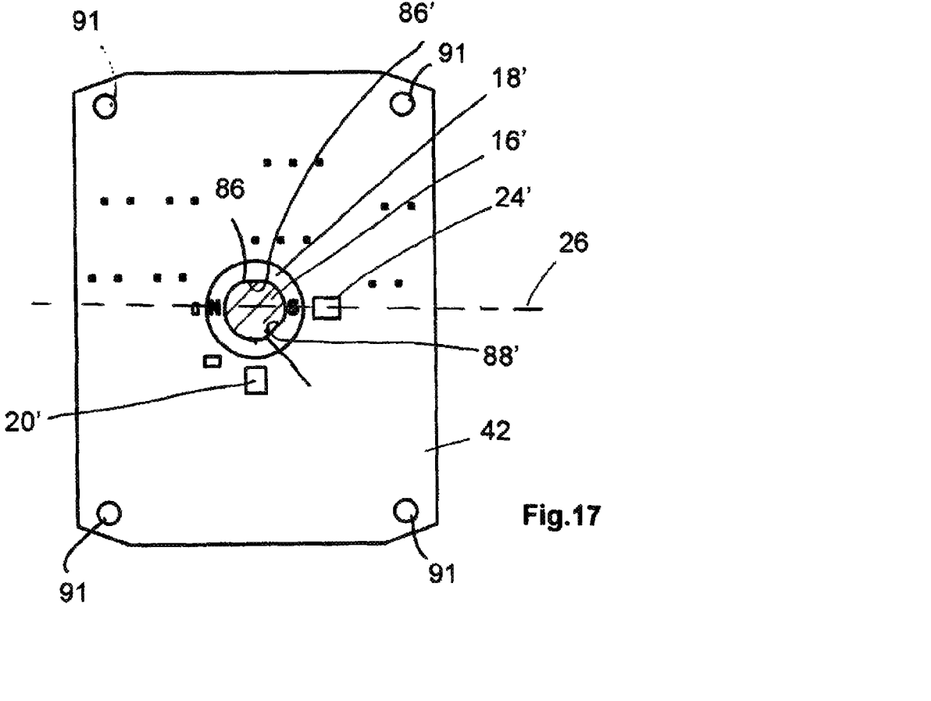
FIG. 17 is a view along line 17-17 of FIG. 16.
Figure 18A:
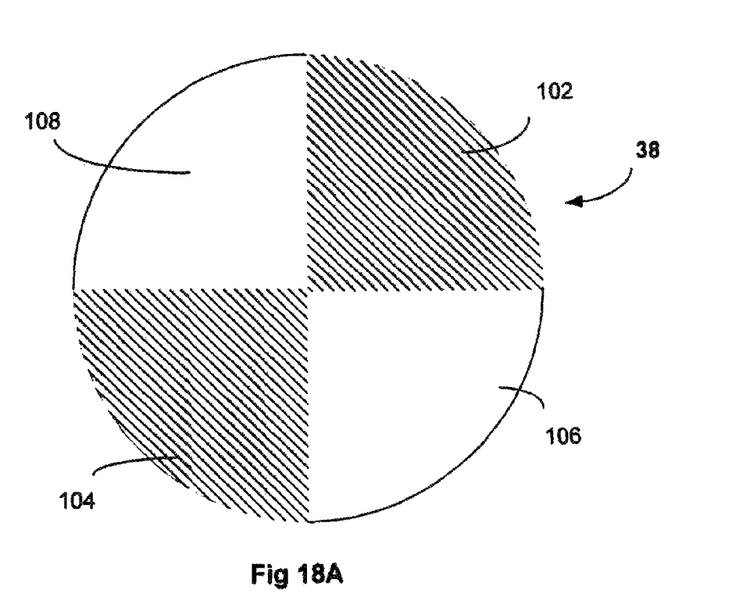
FIG. 18A is a top view of the protective cap which covers the visual indicator of FIG. 10.
Figure 18B:
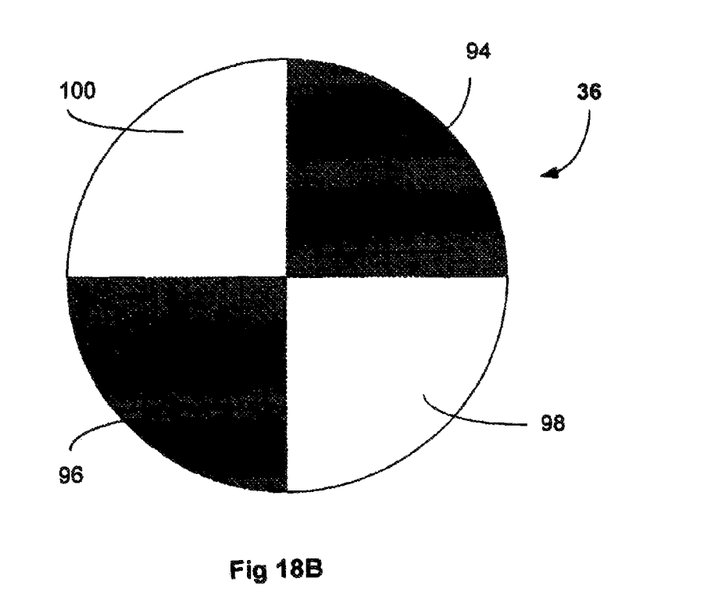
FIG. 18B is a top view of the visual indicator of FIG. 10.

FIG. 17 is a view along line 17-17 of FIG. 16 and it shows the relative position of the main indicator shaft 16' and of the magnet 18' relative to the magnetic pole sensor 24' and the magnetic field sensor 20'. The circuit board 42 defines a plane that is perpendicular to the axis of rotation of the shaft 16' and is between the first and second ends of the main indicator shaft 16'. It can be appreciated that the sensors 20', 24' lie substantially on the same plane as the magnet 18' (defined generally by the plane of the circuit board 42) and are oriented at substantially right angles from each other relative to the axis of rotation of the shaft 16'. In this view, the polar axis 26 of the magnet 18' is aligned with the magnetic pole sensor 24', with the south pole S of the magnet 18' oriented toward the magnetic pole sensor 24'. The flats on the projection 48 (See FIG. 12) on the end 46 of the main indicator shaft 16' are also parallel to the polar axis 26 of the magnet 18'.

To set up the valve position indicator 10', it first is installed onto the bracket 30 (of FIG. 6), with the shaft 16' of the indicator 10' mating with the shaft of the actuator 12. Then the valve 14 is fully closed. Then the installer presses a setup button that communicates with the control circuitry on the circuit board 42. At that point, with the valve 14 in the fully closed position, the magnetic polar sensor 24' indicates to the controller which way the polar axis 26 is oriented, either with the south pole directed toward the sensor 24' or with the south pole not directed toward the sensor 24'. Based on that information, the controller selects the algorithm that will be used thereafter to correlate the output from the magnetic field sensor 20' with the angular valve position. Then the control circuitry on the circuit board 42 outputs the angular position of the valve. It may be output in the form of an angle such as from zero degrees (fully closed) to ninety degrees (fully open) or in the form of percentage open, from 0% (fully closed) to 100% (fully open), or in some other form. The output may go to a digital display on the indicator 10', or it may be transmitted as an electronic signal by a radio transmitter or by a wired connection to a remote location, or it may be output in other known ways.

The output from the valve position indicator 10' also includes the visual output from the mechanical visual indicator 36 at the top of the indicator 10'.

In this instance, if the south pole S of the magnet 18' is directed toward the magnetic pole sensor 24' during setup, corresponding to the fully closed position of the valve 14, as shown in FIG. 17, the magnetic pole sensor 24' senses that polarity during setup and communicates that information to the control circuitry, which uses that information to select the correct algorithm to correlate the data from the magnetic field sensor 20' with the angular position of the valve 14.

Various modifications could be made to the embodiment described above without departing from the scope of the present invention as claimed.

We claim:

1. A method for indicating the position of a valve, comprising the steps of:
    keying an indicator shaft to a valve shaft for rotation with the valve shaft, wherein said indicator shaft and said valve shaft have the same axis of rotation, said indicator shaft having first and second ends and a mechanical visual position indicator secured to said first end,
    keying a magnet to said indicator shaft for rotation with said indicator shaft, said magnet having a north pole, a south pole, and a polar axis, with the polar axis directed perpendicular to and through said axis of rotation,
    mounting a magnetic pole sensor in a first fixed position adjacent said indicator shaft, said magnetic pole sensor including means for providing an output indicating the polarity of the magnet,
    mounting a magnetic field sensor in a second fixed position adjacent said indicator shaft, said magnetic field sensor including means for providing an output that correlates to the angular position of the magnet,
    using said magnetic pole sensor to sense the polarity of said polar axis when the valve is in a known position,
    establishing first and second algorithms for correlating the output of the magnetic field sensor with the angular position of the valve depending upon the polarity of the polar axis when the valve is in that known position,
    selecting one of said first and second algorithms based on that sensed polarity,
    applying the selected algorithm to determine the position of the valve as the valve is opened and closed, and
    providing an output indicating the position of the valve,
    wherein said magnet is a diametrically magnetized ring magnet defining a central opening, and the step of keying the magnet to the indicator shaft includes extending the position sensor shaft through said central opening.

2. A method according to claim 1, wherein said first and second algorithms are in the form of first and second tables.

3. A method according to claim 1, wherein said first and second algorithms are in the form of equations.

4. A position indicator for a rotary valve having a valve shaft, said indicator comprising
    a mechanical valve position indicator and
    an electronic valve position indicator disposed between said valve and said mechanical valve position indicator, said electronic valve position indicator comprising
    a housing,
    an indicator shaft which extends through said housing along a longitudinal axis from said valve shaft to said mechanical valve position indicator,
    a diametrically magnetized ring magnet secured to said indicator shaft, said magnet having north and south poles defining a polar axis extending perpendicular to and through said longitudinal axis,
    said magnet having a central opening through which the indicator shaft passes,
    said indicator shaft having one end keyed to the valve shaft, and an opposite end keyed to said mechanical valve position indicator,
    a stationary magnetic pole sensor secured to the housing adjacent said shaft, said magnet pole sensor comprising a unipolar Hall effect switch for providing an output indicating polarity of the magnet,
    a single, stationary, magnetic field strength sensor secured to the housing adjacent the shaft, for providing an output indicating angular position of said polar axis, and
    a controller responsive to said magnetic pole sensor and to said magnetic field strength sensor, for providing an electronic indication of the angular position of the valve, said controller selecting one of first and second algorithms for correlating the output of the magnetic field sensor with the angular position of the valve, depending upon the sensed polarity of the magnet.

5. A device according to claim 4, wherein said magnet, said pole sensor and said field sensor lie in a common plane.

6. A device according to claim 4, wherein said magnetic pole sensor and said magnetic field sensor are oriented substantially at right angles to each other about said longitudinal axis.

7. A device according to claim 4, wherein said magnetic pole sensor is oriented so that is substantially aligned with one of said north and south poles when said valve is one of fully closed or fully open.

8. A device according to claim 4, wherein said magnetic field strength sensor is a magneto-resistive sensor.

* * * * *